United States Patent [19]

Dobler et al.

[11] Patent Number: 5,025,213

[45] Date of Patent: Jun. 18, 1991

[54] DEVICE FOR DETERMINING A LENGTH OF LINEAR MOVEMENT OR AN ANGLE OF ROTATION OF A MACHINE PART

[75] Inventors: Klaus Dobler, Gerlingen; Hansjörg Hachtel, Weissach, both of Fed. Rep. of Germany

[73] Assignee: Robert Bosch GmbH, Stuttgart, Fed. Rep. of Germany

[21] Appl. No.: 391,555

[22] PCT Filed: Nov. 17, 1988

[86] PCT No.: PCT/DE88/00713

§ 371 Date: Jul. 26, 1989

§ 102(e) Date: Jul. 26, 1989

[87] PCT Pub. No.: WO89/05438

PCT Pub. Date: Jun. 15, 1989

[30] Foreign Application Priority Data

Dec. 2, 1987 [DE] Fed. Rep. of Germany .... 3740800.3

[51] Int. Cl.⁵ .................. G01B 7/14; H01F 21/02; H01F 21/04
[52] U.S. Cl. .................. 324/207.12; 324/207.15; 324/207.24; 324/207.25; 336/45; 336/79

[58] Field of Search .......... 324/207, 208, 225, 207.11, 324/207.12, 207.15, 207.16, 207.17, 207.22, 207.24, 207.25; 336/30, 40, 45, 75, 77, 79, 130, 135

[56] References Cited

U.S. PATENT DOCUMENTS 3,742,340 6/1973 Kiedrowski .................. 324/207.17
4,507,638 3/1985 Brosh ........................ 336/79

Primary Examiner—Walter E. Snow
Attorney, Agent, or Firm—Michael J. Striker

[57] ABSTRACT

A device for determining a length of linear movement of an angle of rotation of a machine part, and comprising spaced first and second bodies, a coil arranged on one of the first and second bodies, and a diaphragm connectable to a machine part for joint displacement therewith and arranged between the first and second bodies for movement relative to the one of the first and second bodies, which diaphragm has an area formed in such a manner than an inductive effect and an eddy current effect which result from axial oscillation of the diaphragm, upon flow of an alternating current through the coil, cancel each other with respect to their electrical action on the coil.

7 Claims, 1 Drawing Sheet

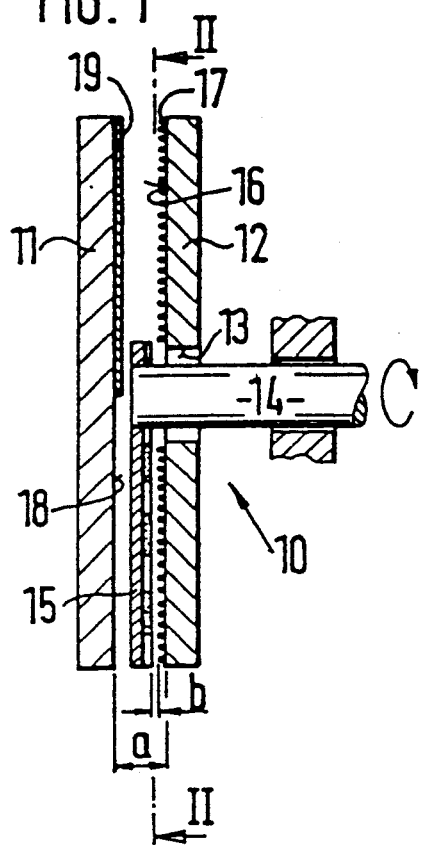
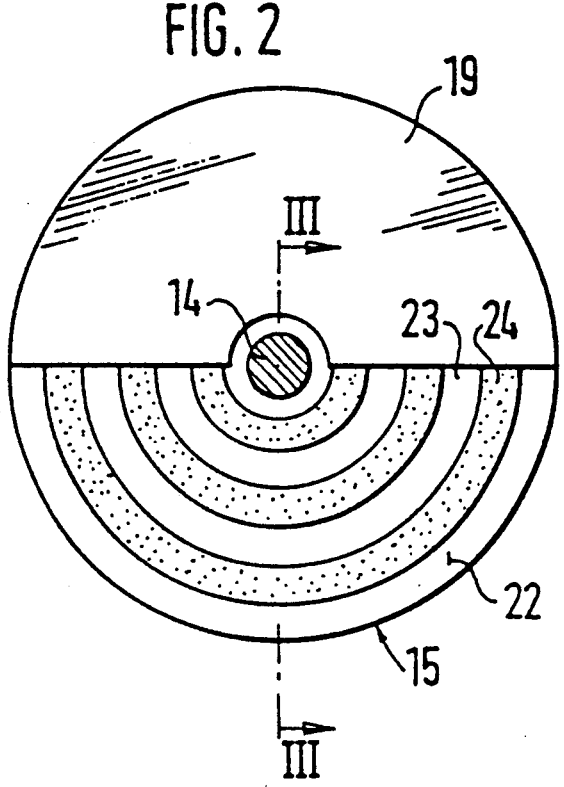
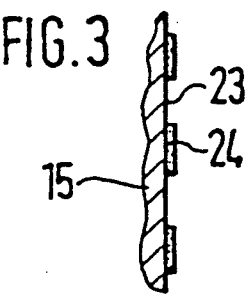
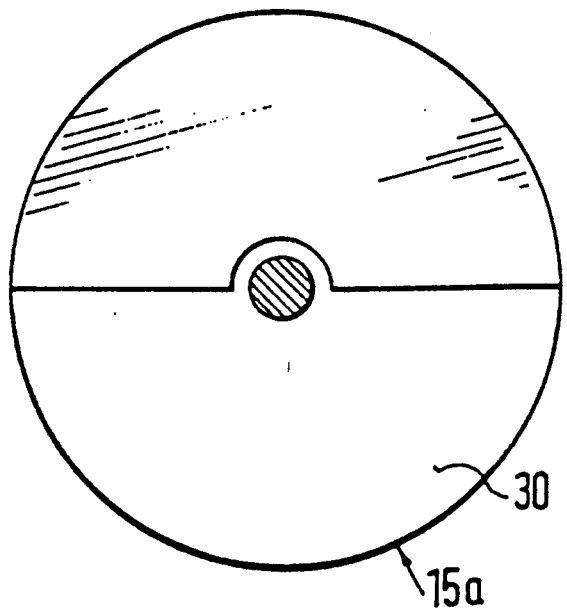
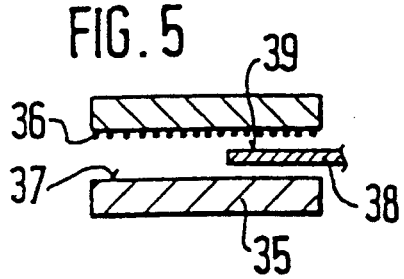

DEVICE FOR DETERMINING A LENGTH OF LINEAR MOVEMENT OR AN ANGLE OF ROTATION OF A MACHINE PART

BACKGROUND OF THE INVENTION

The invention relates to a device for determining the length or the angle of rotation and comprising a diaphragm connected with a machine part and arranged between two stationary bodies of which one has a coil on a surface thereof facing the diagram. A device this type, in which a coil is arranged on a stationary body and a diaphragm is moved between the latter and a second body, is already known. A layer of electrically conductive material is arranged on the side of the diaphragm facing the coil and on a semicircular region of the front side of the second body, which likewise faces the coil. When high-frequency alternating current flows through the coil, eddy currents are formed on the, layers. Due to the screening effect of the diaphragm, the magnitude of the measured-signal voltage is determined by the diaphragm position and the position of a machine part which is connected with the diaphragm is accordingly indicated. In so doing, axial displacements, e.g. due to bearing play or to wobbling movement of the diaphragm, can influence the magnitude of the eddy current formation and can accordingly influence the measured-signal voltage. This can result in a deviation from the characteristic line of the measurement voltage curve and can result in measurement errors.

SUMMARY OF THE INVENTION

The objection of the invention is to provide a measuring device which has the advantage that the measured signal is virtually free of measurement errors deriving from axial displacements or wobbling movements of the diaphragm. The object of the invention is achieved by arranging on the diaphragm alternating electrically conductive regions of non-ferromagnetic and ferromagnetic material in such a manner that eddy current and inductive current actions generated due to axial fluctuation of the diaphragm, cancel each other. The production of the device is simplified, since the bearing play and possible manufacturing errors influence the measured signal only to a negligibly slight degree. The device can be constructed inexpensively.

The present invention both as to its construction so to its mode of operation, together with additional objects and advantages thereof, will be best understood from the following description of the preferred embodiments with reference to the accompanying drawings.

BRIEF DESCRIPTION OF THE DRAWINGS

FIG. 1 shows a longitudinal cross-sectional view of the device according to the invention; FIG. 2 shows a cross-sectional view along line II; FIG. 3 shows a partially cross-sectional view along line III; FIGS. 4 and 5 show partial views a modification of the device according to the invention.

DESCRIPTION OF THE PREFERRED EMBODIMENTS

A device for determining the length or the angle of rotation, particularly in a form of a disk or rotary potentiometer, is designated by 10 in FIG. 10. The device 10 comprises two disks 11, 12 which are arranged so as to be stationary at a constant distance "a" relative to one another. A shaft 14 projects through a central bore hole 13 formed in the disk 12. The shaft 14 leads to a machine part, not shown, whose rotational movement is to be determined. A semicircular diaphragm 15 is arranged at the end of the shaft 14 located between the two disks 11, 12. A coil 17, through which a high-frequency alternating current flows, is located on the inner front side 16, i.e. on the front side of the disk 12 facing the disk 11. A half side of the inner front face 18 of the disk 11 is covered with an electrically conductive layer 19.

On the front side 22 of the diaphragm 15 facing the coil 17, a plurality of strips 23 consisting of ferromagnetic material, and strips 24 consisting of material which is electrically conductive but not ferromagnetic, are arranged in a semicircular manner around the center of the diaphragm 15. The strips 23, 24 consisting of the two different materials are arranged in regular, alternating sequence from the edge of the diaphragm to the center point. In so doing, the diaphragm 15 can be made e.g., of Fe or a free-cutting steel, the strips 24 being electroplated on the latter. It is also conceivable to distribute the different materials on the diaphragm 15 in another geometric arrangement.

When a high-frequency alternating current flows through the coil 17, the magnetic alternating field of the coil 17 acts on the entire surface of the diaphragm 15. In the layers 24 consisting of material which is not ferromagnetic but is electrically conductive, only the eddy current effect is active. In the layers 23 consisting of ferromagnetic material, on the other hand, both the inductive magnetostatic and the eddy current effects are active. Whereas the inductive effect causes an increase in the inductance of the coil 17, the eddy current effect brings about a reduction in the inductance of the coil 17. The two effects thus act in an opposing manner. In addition, the eddy current effect increases as the frequency $f_T$ ($f_T=$ frequency of the alternating current which flows through the coil) of the eddy current increases, while the permeability decreases. If the coil 17 were only located opposite the layer 24 not consisting of ferromagnetic material, or if the alternating effect between this layer 24 and the coil 17 is considered only in an isolated manner, the eddy current resistance of the coil and accordingly—with a corresponding evaluating circuit —the measurement voltage $U_M$ is decreased because of the eddy current effect. On the other hand, if the coil 17 is located opposite the ferromagnetic layer 23 in an isolated manner the measurement volta $U_M$ would increase to the extent that the inductive effect is dominant. However, the respective effect is dependent on the distance "b" between the coil surface and the surface of the layers 23 and 24. If axial displacements or wobbling movements of the diaphragm 15 occur due to tolerances in manufacturing or due to bearing play the distance "b" is changed during the rotational movement. The measurement voltage $U_M$ is changed solely as a result of the change in the distance "b", i.e. by the change in the air gap, due to the inductive and eddy current effects. However, this change in the measurement voltage is not a linear function of the distance "b" in either the inductive or eddy current effect; rather the measurement voltage is increased and reduced in an uncontrolled manner. The measured signal is accordingly falsified. If the two layers 23, 24 are brought into agreement with one another in such a way that the oppositely acting effects are virtually cancelled in the carrier frequency $f_T$ required for measurement, the measurement errors produced by axial displacement can be almost completely eliminated. For this purpose, the shape, the material and the layer thickness, among others, are to be brought into agreement with one another as a function of the frequency of the applied alternating current in such a way that the resistance value of the coil 17 does not change or changes only to a negligible degree during an axial displacement. Accordingly, a device is obtained which works in a contactless manner and whose measurement voltage is not influenced by axial displacement or wobbling movement. In particular, the voltage produced by an inductive effect is eliminated by means of superposition with an eddy current effect.

During the rotational movement of the shaft 14, the measured-signal voltage is dependent on the magnitude of the generated eddy currents which are in turn determined by the magnitude of the surface of the layer 19 on the disk 11. If the diaphragm 15 covers the metallic layer 19 on the disk 11, only negligible eddy currents, or none at all, can be formed on the surface of the layer 19 covered by the diaphragm 15. The rotation of the shaft determines the tangential position of the diaphragm 15 and the magnitude of the measured-signal voltage.

It is also conceivable to apply the strips 23, 24 on the side of the diaphragm 15 remote of the coil 17. However, in so doing, the side facing the coil 17 must consist of electrically non-conductive material, e.g. plastic or ceramic. For an additional error compensation, particularly of temperature effects, two coils, instead of a single coil 17, can be arranged on the front side 17 of the disk 12, the two coils being wired together to form a differential circuit.

In addition, it is also possible, as shown in FIG. 4, to apply a layer 30 consisting only of ferromagnetic material on the diaphragm 15a. In so doing, the coil 17 is to be operated by a carrier frequency $f_{T2}$ in which the eddy current effect and the inductive effect cancel each other out. The level of the carrier frequency is a function of the electrical properties of the ferromagnetic material.

It is also possible to design the device 10 for determining linear movements. For this purpose, a carrier 35, shown in FIG. 5, is covered with an electrically conductive material at its surface 37 facing a coil 36 or the carrier 35 itself is produced from electrically conductive material. A measurement element 38, which corresponds to the diaphragm 15 with respect to its effect, is connected with a machine part, not shown, and is moved between the carrier 35 and the coil 36. The surface 39 of the measurement element 38 facing the coil 36 is coated with strips, like the surface of the diaphragm 15, or with a corresponding pattern of ferromagnetic material and material which is non-ferromagnetic but electrically conductive. The measurement principle is the same as that already described above.

While the invention has been illustrated and described as embodied in a device for measuring length or an angle of rotation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A device for determining one of a length of a linear movement and an angle of rotation of a machine part, said device comprising spaced stationary first and second bodies; at least one coil arranged on one of said first and second bodies, another of said first and second bodies having on a surface facing said first body a surface portion of an electrically conductive material; and a diaphragm connectable to the machine part for joint displacement therewith and arranged in space between said first and second bodies for movement relative to said first and second bodies, said diaphragm having regions formed of an electrically conductive non-ferromagnetic material and regions formed of ferromagnetic material, said electrically conductive non-ferromagnetic regions and ferromagnetic regions alternating in such a manner that an inductive effect and an eddy current effect which result from axial oscillation of said diaphragm, upon flow of an alternating current of a predetermined frequency through said coil, cancel each other with respect to their electrical action on said coil.

2. A measuring device according to claim 1 wherein said electrically conductive non-ferromagnetic regions and said ferromagnetic regions alternate in a regular sequence and are arranged concentrically with respect to a center of said diaphragm.

3. A measuring device according to claim 1 wherein said diaphragm has a first side remote from said coil and on which said electrically conductive non-ferromagnetic regions and ferromagnetic regions are formed, and a second side facing said coil and having a layer of non-electrically conductive material.

4. A measuring device according to claim 1, wherein said diaphragm has a side facing said coil and on which said electrically conductive non-ferromagnetic regions and said ferromagnetic regions are formed.

5. A measuring device according to claim 1, wherein said bodies have a disc-shape when said device serves for determining an angle of rotation.

6. A measuring device according to claim 1, wherein said bodies are plate-shaped when said device serves for determining a length of linear movement.

7. A device for determining one of a length of a linear movement and an angle of rotation of a machine part, said device comprising spaced stationary first and second bodies; at least one coil arranged on one of said first and second bodies, another of said first and second bodies having on a surface facing said first body a surface portion of an electrically conductive material; and a diaphragm connectable to the machine part for joint displacement therewith and arranged in space between said first and second bodies for movement relative to said first and second bodies, said diaphragm having an area with such electrical properties that an inductive effect and eddy current effect which result from axial oscillation of said diaphragm, upon flow of an alternating current of a predetermined frequency through said coil, cancel each other with respect to their electrical action on said coil.

* * * * *